United States Patent [19]

Chaplin et al.

[11] Patent Number: 4,897,021

[45] Date of Patent: Jan. 30, 1990

[54] STATOR VANE ASSSEMBLY FOR AN AXIAL FLOW ROTARY MACHINE

[75] Inventors: Gary F. Chaplin, Veron; John L. Pannone, Glastonbury; Michael A. Weisse, Windsor Locks, all of Conn.

[73] Assignee: United Technologies Corporation, Hartford, Conn.

[21] Appl. No.: 201,505

[22] Filed: Jun. 2, 1988

[51] Int. Cl.⁴ ................................................ F01D 5/02
[52] U.S. Cl. ................................ 415/173.7; 415/174.2; 415/139; 267/160
[58] Field of Search ............... 415/119, 135, 137, 138, 415/139, 170 R, 172 A, 173 R, 173 A, 174, 189, 190, 217, 218; 267/160, 164, 158; 188/307; 277/160

[56] References Cited

U.S. PATENT DOCUMENTS

| | | | |
|---|---|---|---|
| 2,665,642 | 1/1954 | De Ment et al. | 188/307 X |
| 3,295,824 | 1/1967 | Woodwell et al. | 253/39.1 |
| 3,326,523 | 6/1967 | Bobo et al. | 253/78 |
| 3,394,919 | 7/1968 | Catterfeld | 253/78 |
| 3,501,246 | 3/1970 | Hickey | 415/170 R |
| 3,594,010 | 7/1971 | Warth | 415/172 A X |
| 3,601,414 | 8/1971 | Rao | 415/172 A X |
| 3,730,640 | 5/1973 | Rice et al. | 415/117 |
| 3,893,786 | 7/1975 | Rahnke et al. | 415/178 |
| 4,047,843 | 9/1977 | Zeidler et al. | 416/185 |
| 4,053,254 | 10/1977 | Chaplin et al. | 415/116 |
| 4,103,905 | 8/1978 | Desmond et al. | 415/172 A X |
| 4,285,633 | 8/1981 | Jones | 415/191 |
| 4,395,195 | 7/1983 | De Cosmo et al. | 415/137 |
| 4,431,373 | 2/1984 | Monsarrat | 415/189 |
| 4,470,754 | 9/1984 | Manente et al. | 415/173 R X |
| 4,537,024 | 8/1985 | Grosjean | 415/139 X |

FOREIGN PATENT DOCUMENTS

| | | | |
|---|---|---|---|
| 1087138 | 8/1960 | Fed. Rep. of Germany | 415/172 A |
| 751646 | 9/1933 | France | 415/173 B |
| 2404102 | 4/1979 | France . | |

Primary Examiner—Robert E. Garrett
Assistant Examiner—Joseph M. Pitko
Attorney, Agent, or Firm—Gene D. Fleischhauer

[57] ABSTRACT

A stator vane assembly 30 for a rotary machine is disclosed. The stator vane assembly includes an array of stator vanes 44 and an inner air seal 46. Various construction details which damp vibrational stresses in the vanes are developed. In one embodiment, the stator vanes slidably engage the inner air seal. The inner air seal is urged radially into sliding contact with the vanes at the inner ends 52 of the vanes by a resilient device such as a radial spring member 70. In one detailed embodiment, the stator vane has at least two airfoils 55b,c which are circumferentially spaced at their inner ends leaving a circumferential gap therebetween.

9 Claims, 5 Drawing Sheets

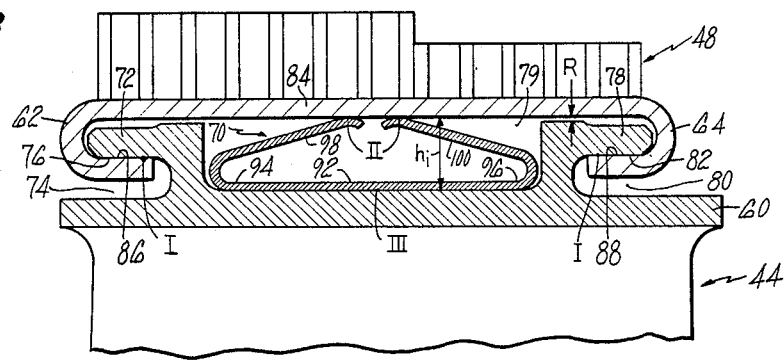
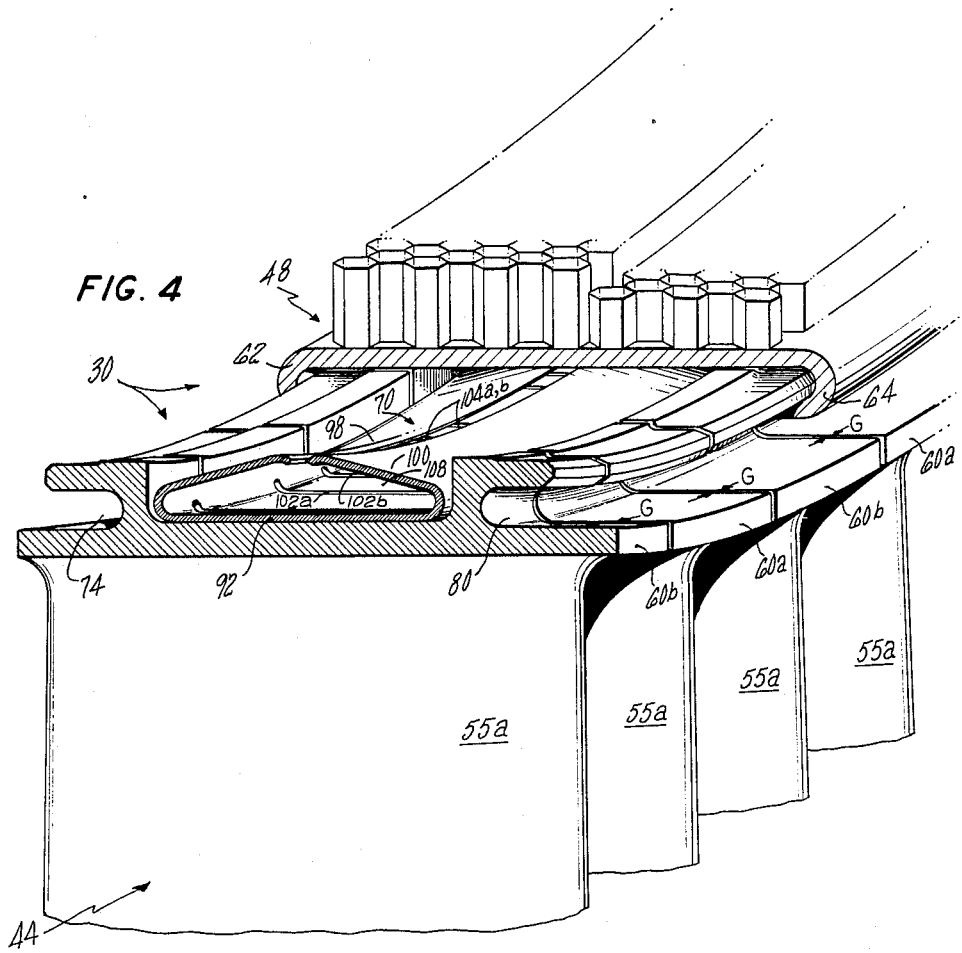

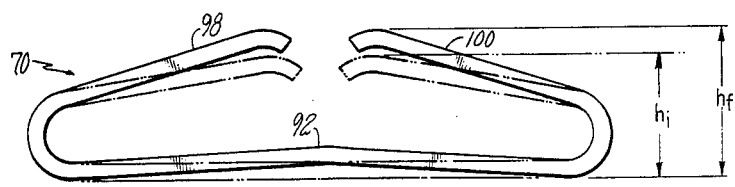
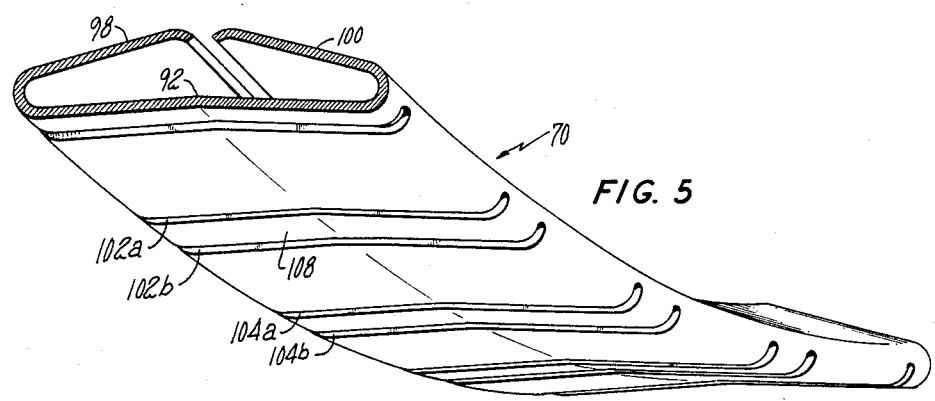
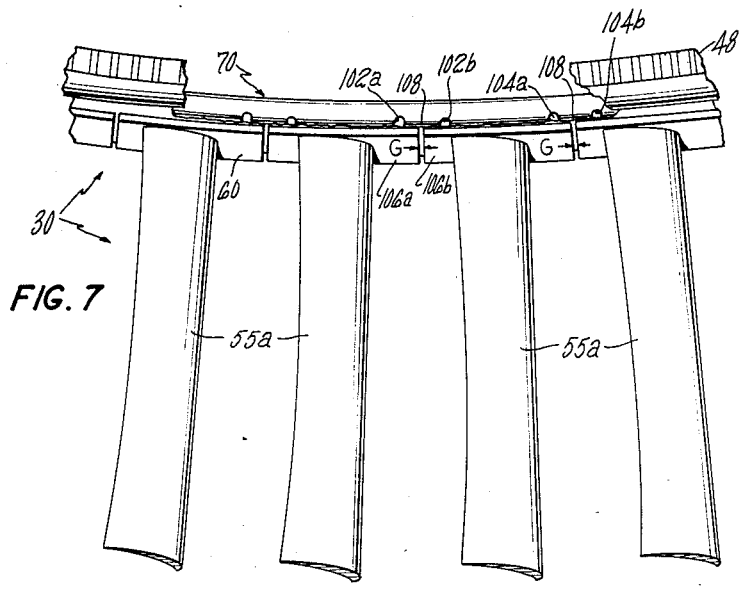

4,897,021

STATOR VANE ASSSEMBLY FOR AN AXIAL FLOW ROTARY MACHINE

TECHNICAL FIELD

This invention relates to axial flow rotary machine which have a rotor assembly and a stator assembly, and more particularly, to damping vibrations in the stator assembly of such an engine.

BACKGROUND

One example of an axial flow rotary machine is a gas turbine engine for powering an aircraft. Such an engine includes a rotor assembly which extends axially through the engine. A stator assembly is spaced radially from the rotor assembly and includes an engine case which circumscribes the rotor assembly. A flow path for working medium gases is inward of the case. The flowpath extends axially through the engine between the stator assembly and the rotor assembly.

The rotor assembly includes rows or arrays of rotor blades. The rows of rotor blades extend radially outward across the working medium flow path into proximity with the case. Arrays of stator vane assemblies are interdergitated with the arrays of rotor blades. The stator vanes extend inward from the case across the working medium flow path into proximity with the rotor assembly to guide the working medium gases as the gases are discharged from the rotor blades.

A stator vane assembly includes a stator vane and an inner air seal which is attached to the inner ends of the stator vanes. The inner air seal extends in close proximity to the rotor assembly to block the leakage of working medium gases from the working medium flow path. One example of such a construction is shown in U.S. Pat. No. 4,431,373 entitled "Flow Directing Assembly for a Gas Turbine Engine" issued to William J. Monsarrat. In this patent, the stator assembly includes an outer case and an inner case which extend circumferentially about the working medium flowpath. Each stator vane is attached at its outer end to the inner case and is joined at its inner end by an inner air seal. The inner air seal is integrally attached to the vanes and extends circumferentially about the rotor assembly. The inner air seal is segmented to accommodate changes in the diameter of the inner air seal which occur as a result of radial movement of the inner case.

Another example of an inner air seal construction is shown in French Patent 2,404,102 entitled "Couronne d'aubage fixe pour turbomachine axiale et son procede de realisation" issued to Claude Dubois. This patent shows an array of stator vanes extending inward from a case. The vanes are integrally attached at their base to the case. The inner ends of the vanes are attached to an inner air seal. The inner air seal has a U-shaped channel which is adapted by elongated holes to receive a tongue on each stator vane. The channel is filled with an abradable sealing material which faces the rotor assembly and provides a sealing surface for the rotor assembly. The abradable material also attaches the U-shaped channel to the stator vane and provides a damping medium for damping vibrations in the stator vane.

Vibrations in the stator vane result from buffeting of the vane by the working medium gases as they pass through the stator vanes and exert aerodynamic forces on the stator vanes. The forces are primarily the result of wakes from the upstream rotor blades and bow waves from the downstream rotor blades and are related to the number of rotor blades in the downstream and upstream rows of rotor blades. Damping is important because it reduces the amplitude of the vibrations which reduces the associated cyclic stresses in the stator vane and insures an adequate fatigue life for the stator vane. These stresses include bending and multimode stresses which result from deflection of the vane and torsional stresses which result from twisting of the vane.

The above art notwithstanding, scientist and engineers working under the direction of Applicants' assignee have sought to reduce vibrations in stator vanes by damping to decrease bending, multimode and torsional stresses in the vane.

DISCLOSURE OF INVENTION

According to the present invention, a stator vane assembly includes a plurality of stator vanes and an inner air seal which is urged radially into sliding contact with the inner ends of the vanes by a resilient device to damp vibrations in the vane and the inner air seal.

In accordance with one embodiment of the present invention, the stator vane has a single airfoil and the resilient device is a radial spring member which urges the inner air seal against the vane and is adapted to slidably engage the inner air seal and the stator vane.

In accordance with one detailed embodiment, the adjacent stator vanes are circumferentially spaced one from the other leaving a gap G therebetween and the radial spring member extends circumferentially between adjacent vanes and across the gap G to block the leakage of gases from the working medium flow path.

In accordance with another detailed embodiment of the present invention, the spring damper has a circumferentially extending base and two circumferentially extending arms which are each attached to an axial end of the base and which are inclined toward each other and, the base in the uninstalled condition is bowed inwardly toward the arms such that in the installed condition the base assumes an unbowed position in contact with the vane.

A primary feature of the present invention is a plurality of stator vanes which extend radially inward into proximity with a rotor assembly. A segmented inner air seal adjacent to the rotor assembly slidably engages the inner ends of the stator vanes in the circumferential direction. Another feature is a spring member for urging a seal segment inwardly in the radial direction to abuttingly engage an associated stator vane. The seal segment slidably engages the stator vane in a non-radial direction such as the circumferential direction or the axial direction. In one embodiment, the spring member is slidable on both the vane and the inner air seal. In one detailed embodiment, the spring member has a circumferentially extending base having an upstream end and a downstream end. Two circumferentially extending arms are inclined toward each other and are each attached to an axial end of the base. The base in the uninstalled condition is bowed toward the arms and in the installed condition is less bowed as the arms are deflected towards the base during installation. In another detailed embodiment, each vane has a single airfoil and an inner platform at the end of the vane. The inner platform is circumferentially spaced from the inner platform of the adjacent vane leaving a circumferential gap G therebetween. The spring member has an axial slot on either side of the gap G faces the associated vane platform. A seal region extends between the slots to block the leakage of working medium gases through the gap G.

A primary advantage of the present invention is the fatigue life of the stator vane and the inner air seal which results from damping vibrations in the vane and the inner air seal by using a resilient member to urge the inner air seal into sliding engagement with the inner end of the stator vane. Another advantage is the engine efficiency which results from using the resilient member as a circumferentially extending seal to block leakage of working medium gases from the working medium flow path. Another advantage is the level of damping which results from positively engaging the inner end of the vane with the spring damper by placing axially extending slots in the spring member at a location adjacent to the gap G between stator vanes. This allows the spring member to firmly seat against adjacent vanes despite tolerance differences which effect the relative radial position of the adjacent stator vane. Another advantage in one embodiment is the level of stress in the spring member which results from the bowed base which deflects outwardly to accommodate movement of the arms as the arms are deflected from the uninstalled to installed condition. Finally, in one detailed embodiment an advantage is the level of vibrational damping which results from the radial force exerted by the spring on the inner air seal and the stator vane at the sliding surfaces between the vane and the inner air seal and the slidable engagement between the spring member and the vane and the spring member and the inner air seal.

The foregoing features and advantages of the present invention will become more apparent in light of the following detailed description of the best mode for carrying out the invention and the accompanying drawing.

BRIEF DESCRIPTION OF DRAWINGS

FIG. 3 is a sectional view taken along lines 3—3 of FIG. 2.

FIG. 4 is a partial perspective view of a portion of the stator vane assembly shown in FIG. 2.

FIG. 5 is a partial perspective view of a spring member.

FIG. 6 is a cross-sectional view of the spring member of FIG. 5 showing the seal member in the installed and the uninstalled condition.

FIG. 7 is a side elevation view of an array of stator vane assemblies with portions of the assembly broken away for clarity.

BEST MODE FOR CARRYING OUT THE INVENTION

Figure 1:
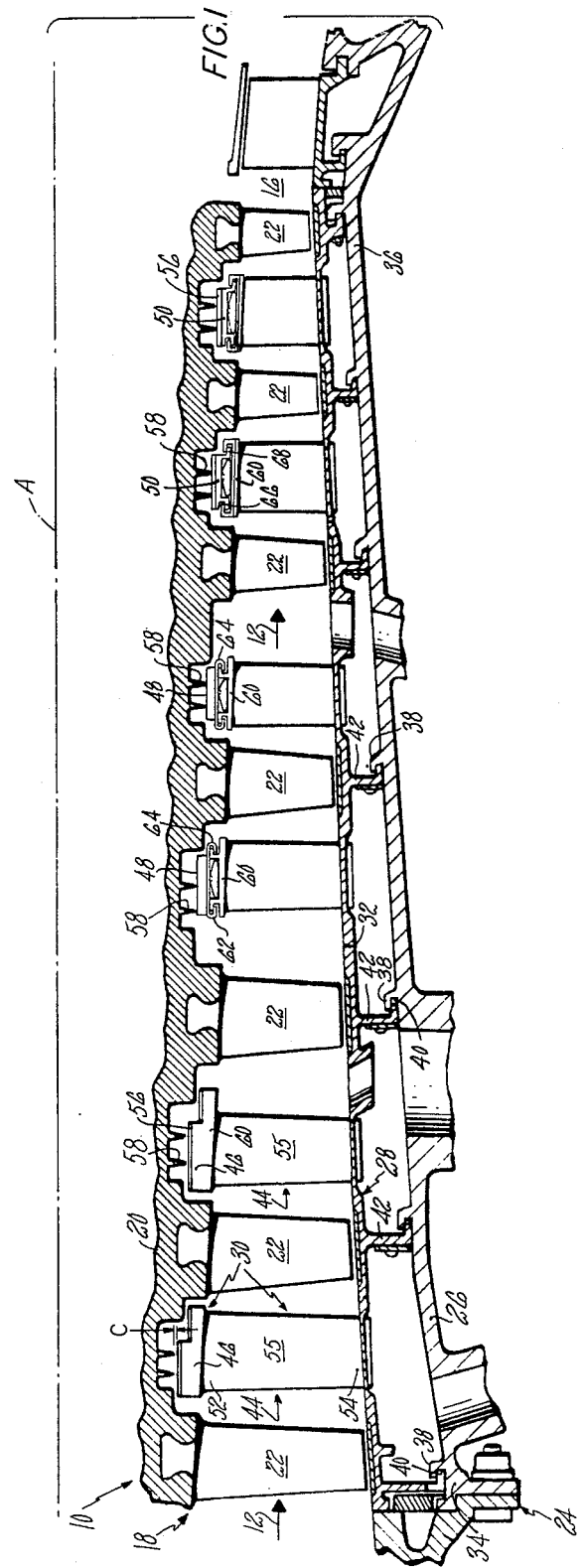
FIG. 1 is a cross-sectional view of a compression section of a gas turbine engine showing an annular sleeve supporting an inner case.

FIG. 1 shows a gas turbine engine embodiment of the present invention and, in particular, shows the compression section 10 of such an engine. The compression section has an axis of rotation A and includes an axial flow path 12 for working medium gases which has an upstream end 14 and a downstream end 16.

A rotor assembly 18 disposed in the compression section 10 includes a drum rotor 20 and arrays of rotor blades 22 which extend outward across the working medium flow path 12. A stator assembly 24 extends circumferentially about the rotor assembly and extends axially through the engine to bound the working medium flow path.

The stator assembly 24 includes an outer case 26 and an inner case 28. Arrays of stator vane assemblies, as represented by the stator vane assembly 30, are disposed between the arrays of rotor blades. Each stator vane assembly extends inward from the inner case across the working medium flow path 12.

The inner case 28 extends axially in the engine outwardly of the annular flow path 12 for working medium gases. The inner case is formed of a plurality of arcuate segments which are circumferentially adjacent to each other, as represented by the single arcuate segment 32.

The outer case 26 is an annular sleeve which is outwardly of the inner case 28 and engages the arcuate segments 32 of the inner case. The annular sleeve is circumferentially continuous in comparison to the circumferential segments of the inner case. The annular sleeve 26 has a large diameter end 34 and a small diameter end 36. The sleeve has a plurality of flanges 38 extending circumferentially about its interior for holding the arcuate segments 32 of the inner case in circumferential alignment. Each flange has a groove 40 facing the large diameter end.

Each arcuate segment 32 of the inner case 28 includes a plurality of circumferential flanges 42. Each inner case flange extends outward to slidably engage a corresponding flange 38 on the annular sleeve 26 in a circumferential direction and to extend axially toward the small diameter end 36 of the annular sleeve into the groove 40 of the flange 38 on the sleeve. Each flange on the sleeve is radially outward of any flange on the inner case which is disposed entirely between the flange on the sleeve and the small diameter end of the sleeve to permit the outer sleeve to slide over the segments of the inner case.

The stator vane assembly includes an array of stator vanes 44 and an inner air seal as represented by the inner air seals 46, 48, and 50. Each stator vane has an inner end, 52 an outer end 54 and at least one airfoil 55 extending between the ends. The outer end is integral (that is, acts as one piece) with the inner case 28. The stator vane may be formed as one piece with the inner case or may be integrally attached to the inner case such as by bolting, welding, brazing, or the like.

The segmented inner air seal or shroud ring, as represented by the three different inner air seals 46, 48, 50, is supported outwardly of the rotor assembly by the inner ends of the vanes. Each inner air seal extends circumferentially about the rotor assembly 18 in close proximity to the rotor assembly. Each inner air seal has an abradable surface 56, such as an abradable material or honeycomb seal material, which faces the rotor assembly. A plurality of seal elements, such as the knife edges 58, extend outwardly into proximity with the inner air seal. The knife edges are spaced radially from the abradable surface by a clearance gap C.

Each segment of the inner air seal 46 is integral with the inner ends 52 of the stator vane 44. The inner air seal segment in one construction engages four or five adjacent airfoils 55 which extend radially inward from the inner case. An example of such a construction is shown in U.S. Pat. No. 4,431,373 entitled "Flow Directing Assembly For a Gas Turbine Engine" issued to William C. Monsarrat where the inner air seal engages three adjacent airfoils.

The inner air seal 48 and the inner air seal 50 are formed of segments, as represented by the segments shown, which slidably engage one or more vanes. Each vane has one airfoil 55 or more than one airfoil 55 joined together at its inner end by a platform. For example, a single vane might have two airfoils or three airfoils joined together at the inner platform. Stator vanes having more than one airfoil are often referred to as vane clusters. In one embodiment, the inner air seal 48 is adapted by flanges 62, 64 to externally overlap the inner end 52 of the vane in the axial direction. In another embodiment, the inner air seal has flanges 66, 68 which are externally overlapped by the end of the vane in the axial direction.

Figure 2:
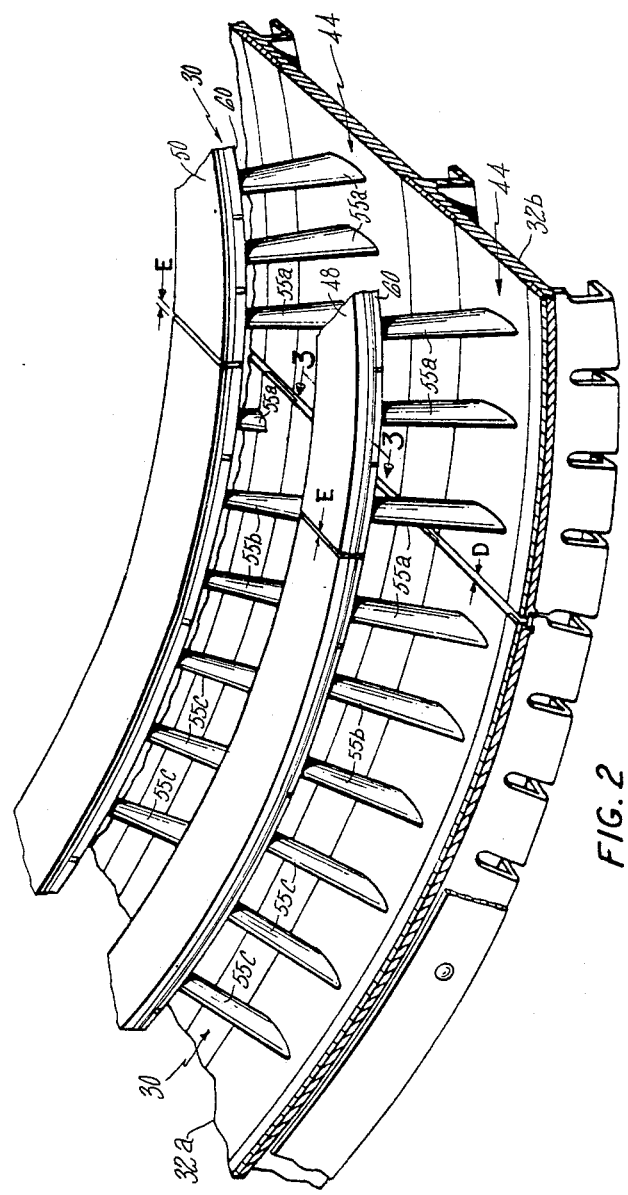
FIG. 2 is a partial perspective view of two adjacent segments of the inner case.

FIG. 2 is a partial perspective view of a portion of two of the arcuate segments 32a, 32b of the inner case 28, the associated arrays of the stator vane assemblies 30 which include the stator vane 44 with either the inner air seal 48, or the inner air seal 50. In one of the embodiments shown, the stator vanes have a single airfoil 55a and an inner platform 60 which is integral with the airfoil. The inner air seal 48 extends axially outward of the flanges on the stator vane to overlap the flanges on the vane inner platform. Alternatively, the stator vane 44 extends axially outward of the flanges on the inner air seal 50 and is axially overlapped internally (not shown) by the inner air seal.

For both embodiments of the inner air seal 48, 50, embodiments exist where the stator vanes have two airfoils 55b for each vane inner platform which are integrally joined to the inner platform. And, embodiments exist where The stator vanes has three airfoils 55c integral with the inner platform.

The inner case 28 is formed of four ninety degree arcuate segments 32. Each segment of the inner case is spaced by a circumferential gap D from the adjacent segment. The inner air seal (whether 48 or 50) of one arcuate segment of the inner case is spaced by a circumferential gap E from the inner air seal of the adjacent segment. The inner air seal might have one ninety degree segment co-extensive with the segment of the inner case or, more preferably for easier assembly, might be three thirty degree segments.

FIG. 3 is a cross-sectional view taken along the lines 3—3 of FIG. 2 showing a portion of the stator vane 44, the inner air seal 48, and means for urging the inner air seal segment in the radial direction, as represented by the resilient radial spring member 70 disposed between the inner platform 60 and the inner air seal. The inner platform has an upstream flange 72 or foot having a circumferentially extending groove 74 facing in the upstream axial direction. The groove is bounded by an axially extending surface 76 on the flange which faces radially outwardly. A downstream flange 78 is spaced axially from the upstream flange leaving a circumferentially extending channel 79 therebetween in which the spring member is disposed. The downstream flange has a circumferentially extending groove 80 which faces in the opposite axial or downstream direction from the upstream groove. The groove is bounded by an axially extending surface 82 on the flange which faces radially outwardly.

The inner air seal 48 has a circumferentially extending element such as the plate 84 which extends axially between the flanges to bound the channel 79. The plate has an upstream leg or flange 62 which extends into the upstream groove 74 of the upstream flange 72. The upstream leg has an inwardly 86 facing surface which overlaps the outwardly facing surface 76 on the flange. The inner air seal has a downstream leg or flange 64 which extends axially in the upstream direction into the downstream groove 80 and has an inwardly facing surface 88 which adapts the flange to slidably engage the outwardly facing surface 82 on the downstream flange. Because each leg and the associated stator vane flange with its groove extend in opposite axial directions, the legs and the flanges cooperate to restrict movement of the inner air seal in the radial and axial directions beyond a limited amount of clearance required for assembly. The plate is also spaced radially from the flanges by a small gap R to provide the clearance necessary to assemble the circumferentially slidable inner air seal to the circumferentially extending flanges of the stator vane.

The circumferentially extending spring member 70 is disposed in the channel 79 and exerts a radial force on the inner air seal 48. The radial force urges the inner air seal radially inward into abutting contact with the vane at the surfaces 76, 86 and 82, 88. In one embodiment, the spring member extends circumferentially over a forty-five degree arc of the ninety degree segment of the inner case.

The spring member 70 has a circumferentially extending base 92 having an upstream end 94 and a downstream end 96. A first circumferentially extending arm 98 is attached to the upstream end of the base. A second circumferentially extending arm 100 is attached to the downstream end of the base. The arms are inclined toward each other. In the installed condition, the arms of the spring are compressed and the spring has a height $h_i$ as measured from the base. The base contacts the vane platform over substantially the entire axial length of the spring member. The spring member is slidable on at least either the inner air seal or the stator vane. In the particular construction shown, the spring member is slidable on both he stator vane and on the inner air seal in the axial and circumferential directions. Thus, there is slidable engagement between the stator vane and the inner air seal and the spring member at areas I, II, and III.

FIG. 4 is a partial perspective view of a portion of the stator vane assembly 30 shown in FIG. 3 which illustrates the method of assembling the inner air seal 48 to the stator vanes 44. As discussed earlier, the stator vane has only a single airfoil 55a joined to the inner platform. Prior to assembling the inner air seal to the stator vanes, the spring member 70 is disposed in the channel. During assembly, the inner air seal slides circumferentially with respect to the stator vanes such that the upstream leg 62 and downstream leg 64 slide into and along the upstream and downstream grooves 74, 80 on the vane platform 60. The arms 98, 100 of the spring member are compressed as the inner air seal is slidably moved in the circumferential direction into engagement with the stator vanes and with the inner air seal.

The platform 60a of each stator vane 44 is spaced circumferentially from the platform 60b of the adjacent stator vane by the circumferential gap G. The clearance gap is provided to accommodate changes in the inner diameter of the array of stator vanes as the inner case 32 moves inwardly and outwardly in response to operative temperatures of the gas turbine engine. Thus, the slidable engagement between the inner air seal and the spring member and the slidable engagement between the spring member and the vane platforms accommodates this movement.

The spring member has pairs of slots, as represented by the slots 102a, 102b and the slots 104a, 104b on either side of the gap G which face an edge region 106 of the platform of the stator vane. The edge region is spaced circumferentially from the center of the platform. Each slot 102, 104 extends axially across the base 92 of the spring member and may even extend as shown into the arm 98, 100 of the spring member. The slots impart radial flexibility to the spring member and allows one circumferential portion of the spring member to deflect with respect to the adjacent circumferential portion of the spring member so that the spring member can engage individually the platform 60 of each stator vane. The pair of slots may be thought of as a single slot which imparts radial flexibility to the spring member which is bridged by a seal region 108 of the base that extends across the gap G and engages the adjacent vane platforms to block the leakage of working medium gases from the working medium flow path. The slots also impart circumferential flexibility to the spring member which aids in assembling the inner air seal to the stator vanes.

FIG. 5 is a partial perspective view of a portion of one of the spring members 70. As mentioned, three thirty degree spring members are used to engage the inner air seal 48 and inner platforms 60 of the array of vanes 44 which are attached to one ninety degree segment 32 of the inner case 28. The partial perspective view shows in more detail the pairs of adjacent slots 102, 104 and the seal region 108 of the base 92 which extends between the adjacent slots.

FIG. 6 is a side elevation view of the spring member 70, and shows the relationship of the spring member in the uninstalled (free) condition to the spring member in the installed (compressed) condition. As shown in full in the uninstalled condition, the base 92 of the spring member is bowed toward the interior of the spring member, that is, toward the arms 98, 100 of the spring member. The arms cause the spring member to have a free height $h_f$. As shown in phantom, the arms have a height $h_i$ in the installed condition. As the arms are deflected inward of the spring member toward the base of the sprig member by reason of being compressed by the inner air seal to the height $h_i$, the base moves to a less bowed position and, in the embodiment shown, is moved to a position where the base is flat against the platform 60 of the stator vane 44 which promotes sealing engagement between the seal region 108 and edge regions 106 of the adjacent vane platforms 60a, 60b. Allowing the bowed base to deflect outward as the arms are compressed inward, reduces the overall maximum stress in the spring member and aids in insuring the spring member retains its resilient characteristic over its expected operative life. A similar benefit occurs if the base moves from a bowed to a less bowed condition, but not to the extent that occurs if the base becomes flat.

FIG. 7 is a side elevation view of the stator vane assembly 30 shown in FIG. 2 with the outer end 54 of the stator vanes 44 and the inner air seal 48 broken away to show the relationship of the seal region 108 of the flattened base 92 to the circumferential gap G between adjacent vane platforms 60a, 60b; and, to show the relationship of the pairs of slots 102a, 102b facing the associated platforms 60a, 60b of the adjacent stator vanes 44 to the edge region 106 of the stator vanes.

Figure 8:
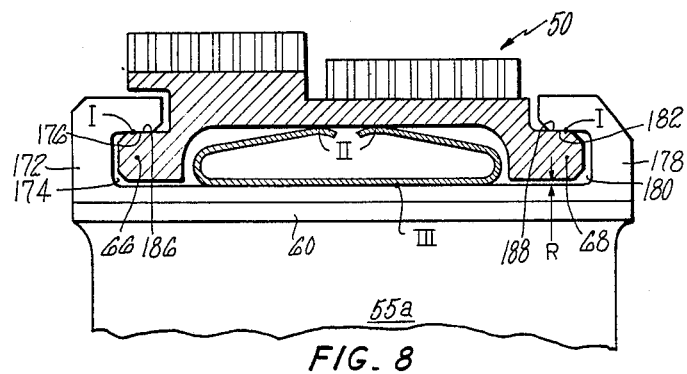

FIG. 8 is a side elevation view of an alternate embodiment of the stator vane assembly 30 shown in FIG. 3 and corresponds to the inner air seal 50 shown in FIG. 1. In this embodiment, the flanges 172, 178 and grooves 174, 180 of the inner platform 160 of the stator vane face each other while facing in opposite axial directions. The inner air seal has legs 66, 68 which extend axially into the grooves and, like the FIG. 3 embodiment, have inwardly facing surfaces 186, 188 which slidably engage the outwardly facing surfaces 176, 182 of the inner platform.

During operation of the gas turbine engine, the rotor assembly rotates 18 about its axis of rotation a and working medium gases are flowed through the compression section of the engine. As the gases are flowed along the flow path 12 through the compression section, each stator vane 44 is affected by aerodynamic wakes of the flow discharged from the array of passing upstream blades 22 or by the bow waves of the passing downstream blades 22. These aerodynamic perturbations causes an integral order of vibrations in the vane. The vibrating vane experiences bending, torsional, and multimode stresses as a result of the vibrations. Relative slidable motion in the axial and circumferential directions between the vane, the spring member and the inner air seal, for example at locations I, II, and III results in a frictional force at the areas of contact which resists vibratory motion of the vane and dissipates the energy of vibration. This frictional force is proportional to the normal force exerted by the spring member and results from the spring rate and the preload that is applied to the spring member at installation. This reduces the vibratory motion of the vanes and correspondingly reduces the bending, torsional and multimode stresses in the vanes.

Another advantage is the engine efficiency which results from providing a seal between the adjacent vanes through use of the spring member 70 which blocks the loss of working medium gases from the flow path of the engine and which results from the pairs of slots, such as slots 102, 104 and the bridging material (seal region 108) which extends between the two slots in the spring member. The slots improve flexibility circumferentially and improve the flexibility radially insuring that at least one point of contact exists between the spring damper and the platform of the vane.

Accordingly, the spring member provides both damping to each stator vane 40 and the inner air seal 48, 50 and provides sealing between each pair of vanes despite normal tolerance variations of these parts The effectiveness of the spring damper is shown in the attached table where the maximum stress for three different resonant conditions of the stator vane are shown for a single airfoil vane, a double airfoil vane and a triple airfoil vane damped by the present invention. The performance of these constructions is compared to a stator vane having an inner air seal shroud 46 or platform 60 which is integrally joined to four or five adjacent airfoils. The stresses are compared to the stress for the three non-integral air seal constructions by dividing through by the maximum stress of the four/five airfoil-/integral air seal construction. The maximum stress occurred at the resonant condition associated with rotor speed $R_2$ in the first torsion mode. The stresses of all configurations nave been normalized by the maximum torsional stress of this configuration.

TABLE

| BLADE PASSING RESONANCE CONDITIONS RESONANCE AT ROTOR SPEEDS $R_1, R_2, R_3$ | FOUR/FIVE AIRFOIL VANE CLUSTER INTEGRAL INNER AIR SEAL $\frac{Sm}{Smt}$ | VANE SINGLE AIRFOIL $\frac{Sm}{Smt}$ | VANE DOUBLE AIRFOIL $\frac{Sm}{Smt}$ | VANE TRIPLE AIRFOIL $\frac{Sm}{Smt}$ |
|---|---|---|---|---|
| $R_1$ 1st Bending Mode Stress | .80 | .33 | .62 | .33 |
| $R_2$ 1st Torsion Mode Stress | 1.00 | .43 | .76 | .52 |
| $R_3$ Multimode Stress | .66 | .48 | .57 | .66 |

Surprisingly, the single airfoil configuration has a maximum stress which was significantly (experimental evidence shows less than half) of the maximum stress for the first bending, the first torsion, and the multimode stress. Thus, the single airfoil damped by the present invention was the design that produced the least stress. It is thought the significant reduction resulted from the greater freedom that a single airfoil has in comparison to double airfoils and triple airfoils engaged by an integral inner platform. Airfoils in clusters have greater difficulty in moving, and because of differences resulting from tolerances each airfoil has a slightly different resonant frequency. This results in greater damping for the single airfoil construction for a given level of stress in the airfoil because the damping is proportional to the amplitude off sliding movement.

Other candidate schemes included a stator vane having three airfoils and a stator vane having two airfoils. Although the spring member and slidable inner air seal decreased stresses in comparison to the integral air seal construction, they did not decrease stresses as dramatically as did the construction where each vane had a single airfoil. However, whether or not the airfoils are connected, the present construction allows the inner end to move to a much greater degree than the outer end of the vane which is secured against movement or where an integral air seal is joined to the airfoils.

Although the invention has been shown and described with respect to detailed embodiments thereof, it should be understood by those skilled in the art that various changes in form and detail thereof may be made without departing from the spirit and the scope of the claimed invention.

We claim:

1. A stator assembly for an axial flow rotary machine having an axis of rotation, a case outwardly of a working medium flowpath and an array of stator vanes extending inward therefrom, which comprises:
   a stator vane having a single airfoil which extends inwardly from the case, an inner end and a surface which is adapted to slidably engage a seal segment;
   a seal segment which extends circumferentially with respect to the axis of rotation, which slidably engages the inner end of the stator vane in the circumferential direction and which axially overlaps the inner end of the stator vane and has a surface which is adapted to slidably engage the stator vane;
   means for urging the seal segment in the radial direction such that the surface of the seal segment abuttingly engages the surface on the stator vane and is slidable thereon in a non-radial direction to provide frictional damping to the stator vane and to the inner air seal.

2. A stator assembly for an axial flow rotary machine having an axis of rotation, an annular flowpath for working medium gases, a casing outwardly of the flowpath and an array of stator vanes extending radially inward from the casing across the working medium flowpath, which comprises:
   A. a plurality of stator vanes each having an inner platform which extends circumferentially and which has a side region spaced from the side region of the inner platform of the adjacent vane leaving a circumferential clearance gap G therebetween, the inner platform having
      1. an upstream flange having a circumferentially extending groove facing in an axial direction, the groove being bounded by an axially extending surface which faces radially outward,
      2. a downstream flange spaced axially from the upstream flange leaving a circumferentially extending channel therebetween, the downstream flange having a circumferentially extending groove facing in the opposite axial direction, the groove being bounded by an axially extending surface which faces radially outward;
   B. an inner air seal having a circumferentially extending element which extends axially between the flanges to bound the channel, the element having an upstream leg which extends into the upstream groove of the upstream flange and a downstream leg which extends into the downstream groove of the downstream flange, each of the legs having an outwardly facing surface which overlaps the inwardly facing surface of the leg and adapts the leg to slidably engage the flange, the flanges and the legs cooperating to restrict movement of the inner air seal beyond an acceptable amount in the radial and axial directions;
   C. a circumferentially extending spring disposed in the channel which urges the inner air seal radially inwardly into abutting contact with the vane, the spring having a circumferentially extending base and two circumferentially extending joined to the base arms which are inclined toward each other,
      1. the base in the uninstalled condition being bowed toward the arms and in the installed condition being less bowed to cause the base to contact the adjacent surface of the vane,
      2. each arm being attached to an axial end of the base such that the spring member has a height $h_f$ in the uninstalled condition and a height $h_i$ in the installed condition which is less than the height $h_f$,
      3. the base having a pair of slots facing the side regions of the adjacent vanes, the slots extending axially in the spring to impart radial flexibility to the spring and being spaced axially leaving a seal region therebetween which extends across the gap G, wherein the seal region blocks the leakage of working medium gases from the flowpath and wherein the base slidably engages the vane and the arms slidably engage the inner air seal to damp vibratory motion of the inner air seal and the vane with frictional force.

3. The stator assembly of claim 2 wherein the groove in the upstream flange of the stator vane faces the groove in the downstream flange of the stator vane.

4. The stator assembly of claim 2 wherein the groove in the upstream flange of the stator vane faces away from the groove in downstream flange of the stator vane.

5. A spring member which extends circumferentially and which has an uninstalled condition free of any restraint and an installed condition in which the spring is compressed against an adjacent stator vane, the spring member having a circumferentially extending base which adapts the spring member to engage the stator vane and two circumferentially extending arms which are inclined toward each other, each arm being attached to an axial end of the base and wherein the base is bowed inwardly towards the arms whereby in the installed condition the base assumes a less bowed position and engages the stator vane, such that the arms have a height $h_f$ in the uninstalled condition and a height $h_i$ in the installed condition which is less than the height $h_f$ ($h_i < h_f$) and wherein, as the arms are deflected toward the base by reason of being compressed during installation, the decrease in bow of the base relieves stresses in the spring member as the spring member is compressed.

6. A stator assembly for an axial flow rotary machine having an axis of rotation, a case outwardly of a working medium flowpath and an array of stator vanes extending inward therefrom, which comprises:
   a stator vane having an inner end and a surface which is adapted to slidably engage a seal segment, the inner end including an inner platform which extends circumferentially and which is spaced from the adjacent stator vanes leaving a circumferential gap G therebetween;
   a seal segment which extends circumferentially with respect to the axis of rotation, which slidably engages the inner end of the stator vane in the circumferential direction and which axially overlaps the inner end of the stator vane and has a surface which is adapted to slidably engage the stator vane;
   means for urging the seal segment in the radial direction which is slidable on at least the stator vane or the seal segment and which exerts a radial force on the seal segment and on the stator vane such that the surface of the seal segment abuttingly engages the surface on the stator vane and is slidable thereon in a non-radial direction to provide frictional damping to the stator vane and to the inner air seal;
   wherein the means extends across the gap G between the vanes to block the leakage of working medium fluid gases from the working medium flowpath.

7. The stator assembly of claim 6 wherein the single airfoil extends inwardly from the outer case and is integral with the inner platform.

8. The stator assembly of claim 7 wherein the spring member is a circumferentially extending spring having a circumferentially extending base and two circumferentially extending arms which are inclined toward each other, each arm being attached to an axial end of the base and wherein the base in the uninstalled condition is bowed inwardly towards the arms and in the installed condition the base assumes a less bowed position and engages the stator vane, wherein the arms have a height $h_f$ in the uninstalled condition and a height $h_i$ in the installed condition which is less than the height $h_f$ ($h_i < h_f$) and wherein, as the arms are deflected toward the base by reason of being compressed by the inner air seal and the array of stator vanes during installation, the decrease in bow of the base relieves stresses in the spring member as the spring member is compressed.

9. The stator assembly of claim 8 wherein the circumferentially extending base of the spring member extends across the circumferential gap between the vanes and has an axially extending slot adjacent each of the gaps, the slot facing the vane to insure that the portion of the base of the spring member facing one of said vanes is able to move radially with respect a portion of the base of the spring member facing the adjacent vane.

* * * * *